March 9, 1948.  H. C. FORD  2,437,463
FIRE CONTROL INSTRUMENT
Filed July 21, 1928  2 Sheets-Sheet 1

INVENTOR
Hannibal C. Ford
BY
ATTORNEYS

March 9, 1948.  H. C. FORD  2,437,463
FIRE CONTROL INSTRUMENT
Filed July 21, 1928  2 Sheets-Sheet 2

INVENTOR
Hannibal C. Ford
BY Moak ley and Gill
ATTORNEYS

Patented Mar. 9, 1948

2,437,463

UNITED STATES PATENT OFFICE 2,437,463

FIRE CONTROL INSTRUMENT

Hannibal C. Ford, Jamaica, N. Y., assignor to Ford Instrument Company, Inc., Long Island City, N. Y., a corporation of New York Application July 21, 1928, Serial No. 294,496

37 Claims. (Cl. 33—49)

This invention relates to fire control instruments and more particularly to mechanism, such as a sighting device, adapted to be maintained in a predetermined relation to a line to a target to serve as a directing and reference element for use with other mechanisms for predicting future positions of the target in order that the guns may be properly aimed for their projectiles to hit the target. While the instrument is especially intended for use in systems for controlling ordnance used against aerial targets it may be employed for ordnance used against surface targets.

In my co-pending application, Serial No. 295,437, filed July 26, 1928, I have shown apparatus of this character which when properly adjusted will automatically maintain a mechanism in a predetermined relation to a line to a target so that the operators of the apparatus are relieved of the necessity of performing the operations of following the target in train and elevation except insofar as they may be required to make adjustments from time to time to correct for changes in the motion of the target.

While in my co-pending application means are provided for compensating for changes in course of the craft on which the apparatus may be mounted, no means are provided for compensating for angular movements of the craft, such as roll and pitch, which would cause continual deviations of the mechanism from the predetermined relation to the line to the target.

It is accordingly a general object of this invention to provide an instrument which when properly adjusted will maintain a mechanism, such as a sighting device, in predetermined relation to a line to a target irrespective of the roll and pitch of the craft on which it is mounted. In other words, the instrument provides a stable plane of reference to serve as a datum from which the movements in elevation of the target may be determined for use in mechanism for predicting future positions of the target. The motion of the craft relative to this stable plane may be divided into two components, roll and cross-roll. Roll, designated L, is the inclination of the deck of the craft in the plane of fire to a true horizontal plane. Cross-roll, designated Z is the inclination of the deck to a horizontal plane at 90° to the plane of fire.

More specifically the stable plane of reference is maintained by means of a gyroscope designated herein as a level gyroscope. The mechanism is maintained in a predetermined relation to a line to the target by a second gyroscope, designated herein as the angle gyroscope, which is caused to precess at the required rate for this purpose by forces applied to it in accordance with the rate of change of the movement of the line to the target due to relative movement between the instrument and the target.

The particular nature of the invention as well as other objects and advantages thereof will appear most clearly from a description of a preferred embodiment as shown in the accompanying drawings in which Fig. 1 is a diagrammatic perspective view of the instrument;

Fig. 3 is a detailed view of a device used in connection with the angle gyroscope.

Figure 1:
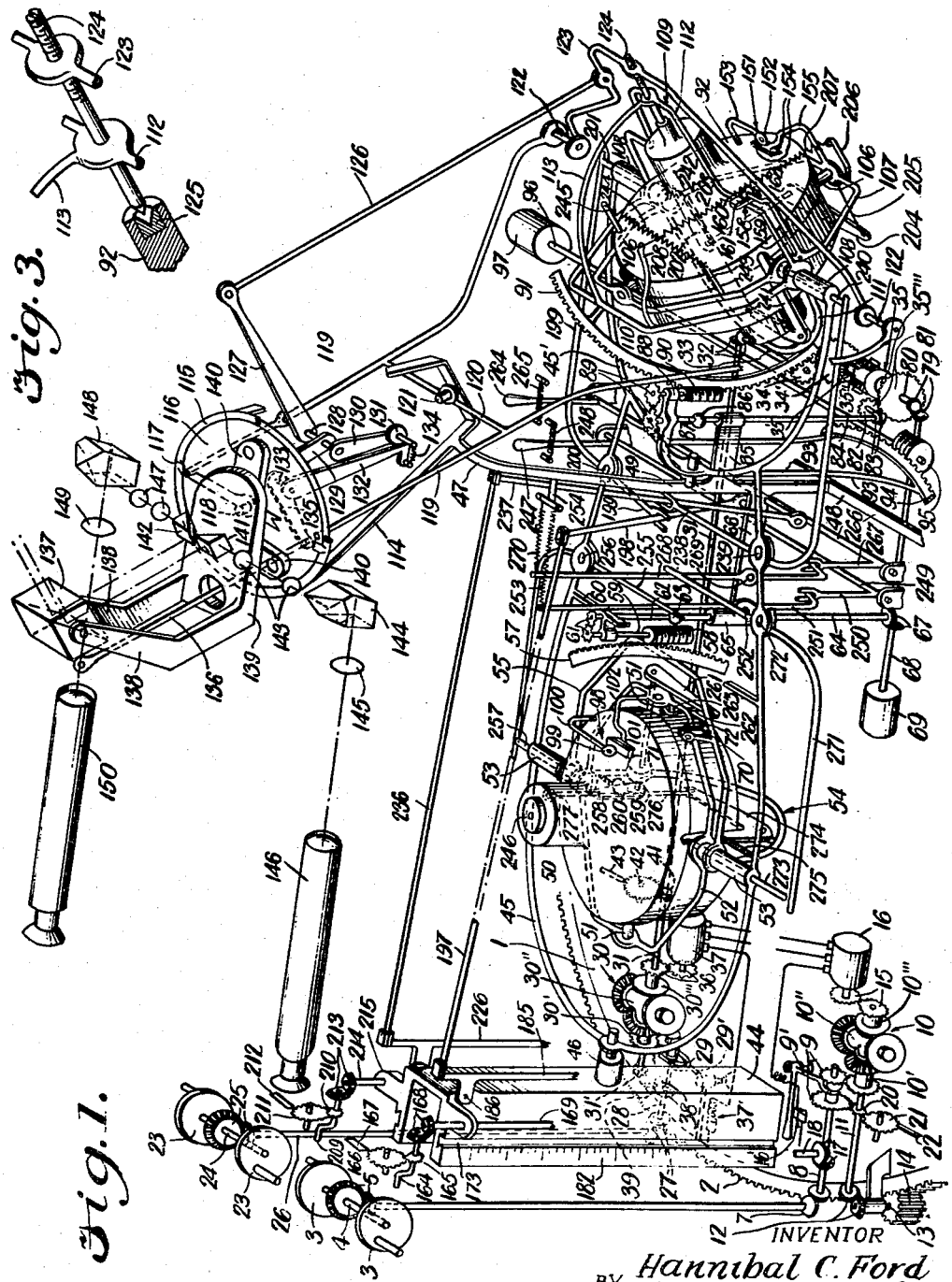

Referring to Fig. 1, I represents the base of the instrument which is rotatably mounted upon a fixed pedestal which carries an annular rack 2 surrounding the base. For the purpose of training the instrument there is provided a pair of trainer's hand wheels 3 which will be understood to be suitably mounted upon the base of the instrument.

These hand wheels are connected by a shaft 4 which through bevel gears 5, a shaft 6 and bevel gears 7 drives a shaft 8 having splined upon its free end a pair of unified gears 9 adapted to be shifted by a lever 9'. When in the position shown one of the gears engages a gear forming part of the side 10' of a differential designated generally as 10. The center 10'' of the differential is attached to a shaft 11 which through bevel gears 12 and shaft 13 drives a pinion 14 meshing with the training rack 2. The shaft 13 is mounted in a bracket attached to the base of the instrument. The third side 10''' of the differential is connected through gears 15 with a motor 16 controlled from the angle gyroscope of the instrument as will hereinafter be described. The shaft 8 drives through bevel gears 17 and shaft 18 an electrical generator 19 shown in Fig. 2 and the function of which will be hereinafter explained. The shaft 11 is provided with a pinion 20 adapted to be engaged by the other gear of the pair 9 when the shifting lever is operated. The pinion also drives a dial 21 readable against a pointer 22 for showing the bearing of the instrument. The shifting lever 9' is provided with a switch 16' in the circuit of the motor 16 as will more clearly appear when the circuits of the instrument are described in connection with Fig. 4. The switch consists of a fixed contact element and a movable contact element attached to the lever.

The pointer of the instrument is furnished with a pair of hand wheels 23 suitably mounted upon the base of the instrument and connected by a shaft 24 which through bevel gears 25, shaft 26, and bevel gears 27 drives a shaft 28 having splined upon its free end a pair of unified gears 29 adapted to be shifted by a lever 29'. When in the position shown one of the gears engages a gear forming part of the side 30' of a differential 30. The center 30'' of the differential is attached to a shaft 31 extending through the side 30' and provided with a pinion 31' adapted to be engaged by the other gear of the pair 29 when the shifting lever is operated. The shaft 31 extends in the other direction through the instrument where it drives bevel gears 32, shaft 33, gear 34 and gear 34' attached to one side 35' of a differential 35, the other elements of which will be hereinafter described. The second side 30''' of the differential 30 is connected through gears 36 to a motor 37 controlled by the angle gyroscope as will hereinafter appear. The shifting lever 29' is provided with a switch 37' in the circuit of the motor 37 as will appear more clearly in connection with the description of Fig. 4, this switch being similar to switch 16' previously described.

As in the case of the training elements of the instrument, the shaft 28 is connected to bevel gears 38 and shaft 39 to a generator 40, the function of which will be hereinafter explained. Similarly the shaft 31 is provided with a pinion 41 for driving a dial 42 reading against an index 43 to show the elevation of the instrument.

Rising from the base 1 near its periphery is a standard 44 which serves as a support for one end of a main frame 45 through a suitable bearing 46. Another standard 47 rises from a member 48 which will be understood as being attached to the base of the instrument. The standard 47 serves as a second support through a bearing 49 for the main frame 45 which at this part of the instrument is formed with an arcuate portion 45' between the ends of which the angle gyroscope 92 is mounted as will hereinafter appear.

For the purpose of stabilizing the elements of the instrument there is provided a level gyroscope 50 consisting of a rotor and a case, the latter being provided with trunnions 51 mounted within a gimbal ring 52 which in turn is mounted upon tubular trunnions 53 integral with opposite sides of the main frame 45 and lying at right angles to the trunnions 51. A double bail frame 54 is mounted at its ends upon the trunnions 53 and consists of a horizontal portion 55 and a vertical depending portion 56. The portion 55 carries a vertically disposed gear sector 57 meshing with a worm 58 on a shaft 59 mounted in a transverse member 60 of the main frame 45. The shaft is connected by pinions 61 to a shaft 62 also mounted in the transverse member 60 and connected at its lower end through a universal joint 63 to a shaft 64, the universal joint being on the line between the bearings 46 and 49 of the main frame so as to allow for the relative movement between the main frame and the parts carried thereby on the one hand and the parts movable with the base of the instrument on the other hand. The shaft 64 passes through a bearing 65 at the outer end of a bracket 66 extending from the standard 47.

The lower end of shaft 64 is connected by bevel gears 67 to a shaft 68 connected to a motor 69 controlled from a contact device 70 associated with the level gyroscope 50. The device consists of a roller 71 attached to but insulated from the portion 55 of frame 54 and coacting with a pair of contacts 72 insulated from each other and from the gimbal ring 52 on which they are mounted. As shown most clearly in Fig. 4 the roller is electrically connected to one main 73 of a source of current supply and the contacts are connected by conductors 74 to the reversely wound field windings 75 of the motor 69, the armature 76 of which is connected by a conductor 77 to the other main 78.

As shown in Fig. 1 the shaft 68 is also connected through bevel gears 79 to a shaft 80 attached to the center 35'' of the differential 35. The other side 35''' of the differential is connected through gears 81, shaft 82, and bevel gears 83 to a shaft 84 passing through a bearing in a bracket 85 extending from the standard 47. The upper end of shaft 84 is connected to a universal joint 86 in line with the bearings 46 and 49 of the main frame. The universal joint is also connected to a shaft 87 passing through a bracket 88 forming part of the main frame. Through gears 89 the shaft drives a worm 90 meshing with a gear sector 91 forming part of the mounting of the angle gyroscope 92 as will presently be described.

Figure 4:
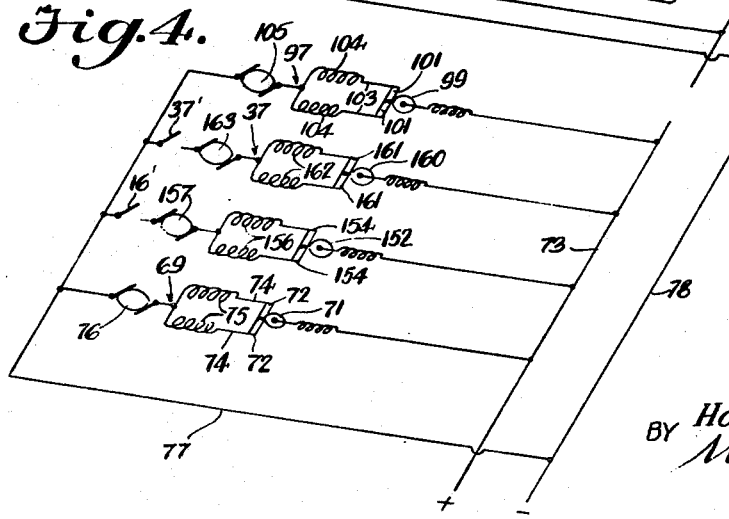
Fig. 4 is a wiring diagram.

The arcuate portion 45' of the main frame is provided on opposite sides of the bearing 49 with a pair of depending members 93 between the lower ends of which extends a gear sector 94 meshing with a worm 95 on a shaft 96 connected to a motor 97 controlled by a contact device 98 associated with the level gyroscope 50. This device is similar to the device 70 previously described and consists of a roller 99 carried at the end of a bracket 100 attached to but insulated from the case of the gyroscope. The roller coacts with a pair of contacts 101 insulated from each other and from a supporting bracket 102 extending upwardly from the portion of the gimbal ring 52 which serves as a bearing for one of the trunnions 51. As shown in Fig. 4 the roller 99 is electrically connected to the main 73 and the contacts 101 are connected by conductors 103 to the reversely wound field windings 104 of the motor 97, the armature 105 of which is connected to the conductor 77 leading to the other main 78.

The case of the angle gyroscope 92 is provided with trunnions 106 mounted within a gimbal ring 107 which in turn is mounted upon tubular trunnions 108 integral with the free ends of the arcuate portion 45' of the main frame. Also mounted upon the trunnions 108 is a triple bail frame 109 consisting of a portion 110 to which the upper end of the gear sector 91 is attached, a portion 111 to which the other end of the sector is attached and a portion 112 shaped to conform generally to the contour of the case of the angle gyroscope and connected at its outermost portion with the portion 110 by a part 113.

At its upper end the standard 47 carries a frame 114 having at its upper end an annular member 115 within which is a circular plate 116. The annular member 115 has a cross bar 117 which has a bearing at its center for a trunnion 118 which is rigid with and projects from the upper side of the plate 116. Extending downwardly from the plate is a pair of side arms 119 connected by a cross bar 120 mounted at its center upon a trunnion 121 attached to the bottom of the frame 114. Below the cross bar the side arms 119 extend outwardly and carry at their lower ends trunnions 122 which serve as supports for the ends of a bail 123 which at its outermost portion is enlarged (as shown most clearly in Fig. 3) and carries a pin 124 threaded therethrough. The pin extends through a corresponding enlargement at the junction of the portions 112 and 113 of the frame 109 and has a pointed inner end extending within a recess in a plug 125 of suitable material, such as cork, embedded in a recess in a projecting portion of the case of the angle gyroscope.

Connected to the ball 123 is a link 126 attached at its upper end to an arm 127 on a shaft 128 mounted in a bearing in one of the side arms 119 and in a bearing member 129 extending from the lower side of the plate 116. The shaft 128 also carries an arm 130 having a roller 131 at its free end. The roller bears against the lower edge of another arm 132 on a shaft 133 mounted in a bearing on the underside of the plate 116. The edge of the arm 132 is held against the roller 131 by a spring 134. The shaft 133 also carries an arm 135 to which is attached a link 136 extending to a reflecting prism 137 mounted between the ends of arms 138 extending upwardly from a base 139 which is attached to the circular plate 116 by depending lugs 140 to provide space below the base for the cross bar 117 and the end of trunnion 118.

Optically associated with the reflecting prism 137 is a pair of reflecting prisms 141 and 142. Optically associated with the reflecting prism 141 is a pair of lenses 143, a pentaprism 144, a lens 145 and a telescope 146 for the trainer of the instrument. Similarly associated with the prism 142 is a pair of lenses 147, a pentaprism 148, a lens 149 and a telescope 150 for the pointer of the instrument. It will be understood that all of the optical elements excepting the prism 137 are suitably mounted in fixed relation to the base of the instrument.

Associated with the angle gyroscope 92 is a contact device 151 consisting of a roller 152 on a bracket 153 attached to but insulated from the case of the gyroscope. The roller coacts with a pair of contacts 154 insulated from each other and from a bracket 155 by which they are carried upon the gimbal ring 107 of the gyroscope. As shown most clearly in Fig. 4 the roller 152 is electrically connected to the main 73 and the contacts 154 are electrically connected to the reversely wound field windings 156 of the motor 16, the armature 157 of which is connected through the switch 16' associated with shifting device 9' to the conductor 77 leading to the main 78. These elements constitute the means by which the training motor 16 is controlled automatically from the angle gyroscope as will be more fully explained hereinafter.

A similar contact device 158 is provided for controlling the elevation motor 37 from the angle gyroscope. For this purpose an arm 159 is attached to but insulated from the gimbal ring 107 and carries a roller 160 coacting with a pair of contacts 161 insulated from each other and mounted on but insulated from the portion 112 of the frame 109. As shown in Fig. 4 the roller 160 is connected to the main 73 and the contacts 161 are connected to the reversely wound field windings 162 of the motor 37, the armature 163 of which is connected to the conductor 77 leading to the main 78, the circuit passing through the switch 37' associated with the shifting device 29'.

The angle gyroscope 92 is caused to precess to maintain its spinning axis directed at a target and thereby control the movements of the instrument. For the purpose of applying the torque which causes the gyroscope to precess in train there is mounted upon the standard 44 a crank 164 adapted to be set in accordance with the rate of change of bearing of the target in the plane of the line of sight and a horizontal line perpendicular to the line of sight, as determined by suitable calculating mechanism forming no part of the invention. While as shown herein this quantity is adapted to be put into the instrument manually, it may be applied automatically by suitable means, such as the shaft 253 of my copending application referred to above, by adding to the present device the calculating mechanism of that application. The crank is provided with a pinion 165 for driving a dial 166 reading against a pointer 167 to show when the correct value of the quantity has been applied by the crank.

The crank is connected through bevel gears 168 to a shaft 169 mounted in a bracket extending from the top of the standard 44. As shown most clearly in Fig. 2 the lower portion of the shaft is screw-threaded through a lug 170 projecting from a carriage 171 movably mounted, as by means of rollers 172, within a channel 173 in one side of the standard. Pivotally mounted on the carriage is a lever 174 having a substantially vertical arm 175 and an arm 176 inclined to the former arm. A tension spring 177 is connected at its lower end to the free end of arm 176 and at its upper end to a rod 178 mounted in brackets 179 extending from the carriage 171. The top of the rod is screw-threaded and carries a nut 180 by which the tension of the spring may be adjusted. The carriage is also provided with an index mark 181 reading against a scale 182 on the standard 44.

Pivotally attached to the upper end of the vertical arm 175 is a forked member 183 carrying a pair of rollers 184 which are pressed by the spring 177 against a rod 185 pivoted at 186 to the standard 44. The lower end of the rod 185 carries a coil 187 electrically connected by conductors 188 with the armature 189 of generator 19, the field 190 of which is connected by conductors 191 to the mains 73 and 78. The coil 187 surrounds a pole piece 192 of an electro-magnet 193 having its coil 194 connected to the mains 73 and 78 by conductors 195 and its other pole piece 196 shaped to terminate near the bottom of the coil 187.

The top of the rod 185 is connected by a strap 197 to an arm 198 pivoted at its lower end upon the extension 66 of the standard 47. The arm 198 passes through the forked end of an arm 199 pivoted at 200 in one of the side members of the main frame 45. The other end of the arm engages a rod 201 passing through the hollow trunnion 108 and engaging an arm 202 on a shaft 203 suitably mounted in the portion 111 of the triple-bail frame of the angle gyroscope. The other end of the shaft carries an arm 204 which is connected by a wire 205 to the gimbal ring 107 at a point near the lower trunnion 106. The gimbal ring is also provided with an arm 206 to which is connected one end of a spring 207, the other end of which is connected to an arm 208 attached to the portion 110 of the triple-bail frame.

The scale 182 reads in opposite directions from a zero point and the parts are so proportioned that when the index mark 181 on carriage 171 coincides with the zero point, the forces applied to the angle gyroscope by the spring 177 acting through the lever 174, rod 184, strap 197, arms 198 and 199, rod 201, arms 202 and 204 and wire 205 is exactly balanced by the force exerted by the spring 207 connected between the triple-bail frame 109 and the gimbal ring 107 to which the wire 205 is connected, so that under these conditions no torque is applied to the angle gyroscope about its trunnion axis 108—108.

Figure 2:
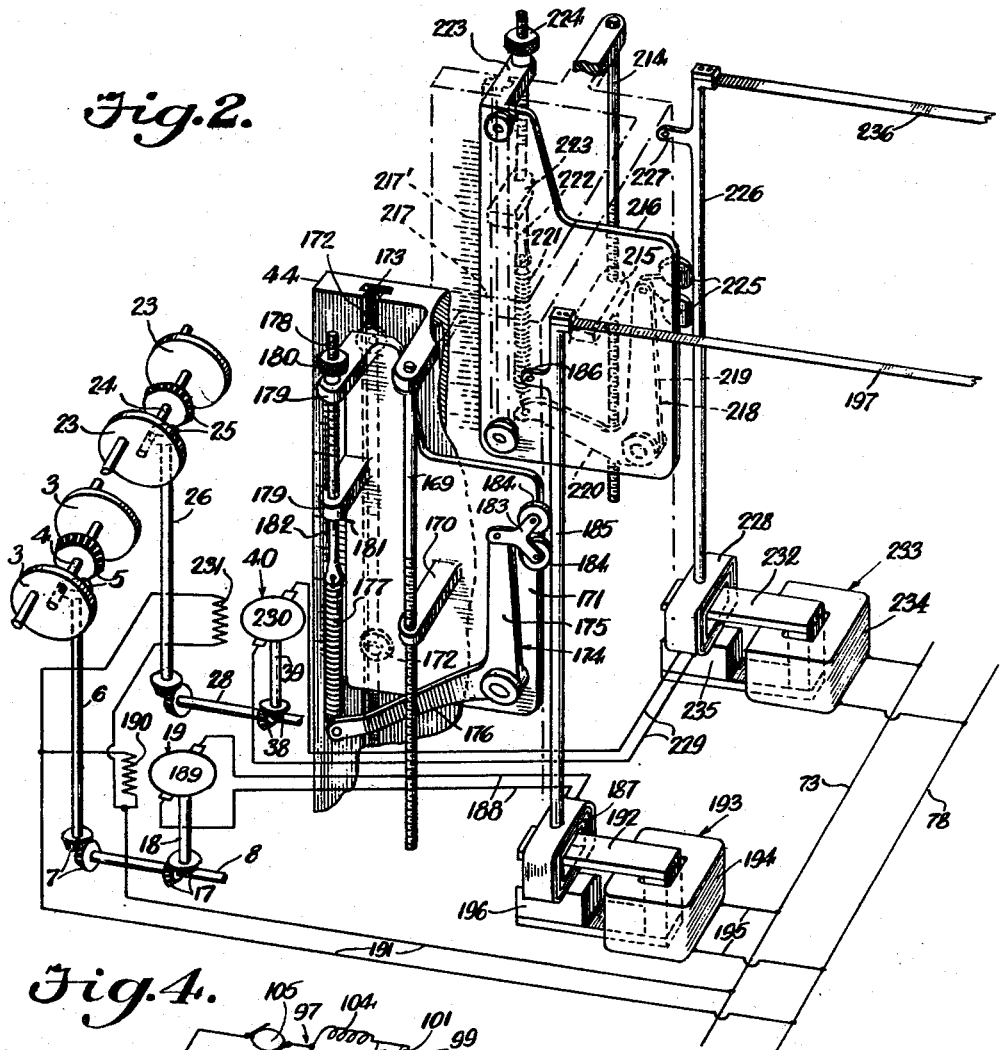
Fig. 2 is a view on an enlarged scale of the mechanism for applying torques to the angle gyroscope of Fig. 1 to cause it to precess as required.

Similar mechanism is provided for applying a torque to the angle gyroscope to cause it to precess in elevation. This mechanism consists of a crank 209 adapted to be set in accordance with the rate of change of elevation of the target as determined by suitable devices. As in the case of the corresponding train element 164, the elevation element may be set automatically by a member, such as a shaft 373 of my copending application referred to above. The crank 209 is connected by a pinion 210 with a dial 211 readable against an index 212 to show the value put into the instrument. The crank is connected by bevel gears 213 to a shaft 214 mounted in a bracket at the top of the standard 44 and, as shown most clearly in Fig. 2, is provided with a screw-threaded portion extending through a lug 215 projecting from a carriage 216 similar to the carriage 171 and mounted by rollers in the opposite side of the standard 44. The carriage bears an index mark 217 reading against a scale 217' on the standard.

The carriage 216 carries a lever 218 having a vertical arm 219 and an arm 220 inclined thereto. The free end of the arm is connected to a spring 221 attached to a rod 222 passing through brackets 223 projecting from the carriage 216 and provided at its upper end with an adjusting nut 224. The upper end of the vertical arm 219 carries a pair of rollers 225 engaging a rod 226 pivoted at 227 to the standard 44 and carrying at its lower end a coil 228 connected by conductors 229 to the armature 230 of the generator 40, the field 231 of which is connected to the conductors 191 leading to the mains 73 and 78. The coil 228 surrounds one pole piece 232 of an electro-magnet 233, the coil 234 of which is permanently connected to the mains 73 and 78. The other pole piece 235 is shaped to lie near the bottom of the coil 228.

The upper end of the rod 226 is connected by a strap 236 to an arm 237 pivoted on the bracket 66 of the standard 47 and passing through the forked end of an arm 238 pivoted at 239 in the other side member of the main frame 45. The other end of the arm engages a rod 240 movably mounted in the hollow trunnion 108 and engaging the end of a crank 241 pivoted upon the portion 111 of the triple-bail frame and connected at its other end to a wire 242 attached to the case of the angle gyroscope 92. The gimbal ring 107 carries a bracket 243 connected by a spring 244 to a bracket 245 attached to the case of the gyroscope.

As in the case of the mechanism for precessing the angle gyroscope in train, the parts just described are so proportioned that when the index mark 217 of the carriage 216 coincides with the zero point of the corresponding scale 217' the force applied to the angle gyroscope by the spring 221 through lever 218, rod 226, strap 236, arms 237 and 238, rod 240, crank 241 and wire 242 is exactly balanced by the force exerted by the spring 244 connected between the gimbal ring 107 and the case of the angle gyroscope to which the wire 242 is also attached, so that under these conditions no torque is applied to the gyroscope about the trunnion axis 106—106.

The arms 176 and 220 of levers 174 and 218 respectively are so inclined with respect to the springs 177 and 221 of the levers that any changes of position of the rods 185 and 226 are not accompanied by any changes of pressure of the rollers 184 and 225 respectively and therefore no changes in the torques applied to the angle gyroscope by these elements. The forces exerted by the springs upon the rods would normally vary with changes in the lengths of the springs, but the parts are so proportioned that there are compensating changes in the effective leverages of the inclined arms, so that the resultant forces applied to the rods are substantially constant.

Similarly the springs 207, and 244 are so connected that small variations in the position of the gyroscope tending to alter the length and consequently the pull of the springs are so compensated through the moment arm of the point of connection that the torque applied to the gyro remains substantially constant.

As gyroscopes are subject to straying or wandering from their true positions provision is made in the instrument for compensating for such straying as otherwise errors in the positioning of the elements of the apparatus which depend upon the level gyroscope 50 would be introduced. For the purpose of detecting such straying the top of the case of the gyroscope carries a spirit level 246 in which departure of the bubble from its normal position indicates straying of the gyroscope.

In general, compensation for straying is produced by precessing the gyroscope back to its normal position by the application of a torque of the required magnitude about one or both of its axes. For this purpose there is provided a handle 247 centralized by a spring 248 and attached to a rod 249 mounted in suitable bearings and provided with an arm 250 having a forked extremity which engages the lower end of a lever 251 pivotally mounted at 252 on the bracket 66 of the standard 47. The upper end of the lever is connected by a spring 253 to a member 254 attached to the upper portion of the standard 47. At an intermediate point the lever 251 engages a lever 255 pivotally mounted at 256 upon one of the side members of the main frame 45. The other end of this lever engages a rod 257 slidably mounted in the corresponding hollow trunnion 53. The inner end of the rod engages the upper end of an arm 258 attached to a shaft 259 mounted in a bearing in the portion 56 of the double-bail frame 54. A spring 260 is connected between the arm and the portion of the frame just referred to. An arm 261 is attached to the other end of the shaft 259 and has attached to its free end a strap 262 terminating in an eye surrounding but normally out of contact with a pin 263 projecting inwardly from the gimbal ring 52 below the corresponding trunnion 51.

A substantially similar arrangement is provided for applying a torque about the other axis of the level gyroscope. This consists of a handle 264 provided with a centralizing spring 265 and attached to a rod 266 mounted in suitable bearings and having an arm 267, the forked end of which engages the lower end of a lever 268 pivotally mounted at 269 upon the bracket 66 and connected at its upper end by a spring 270 to the member 254. At an intermediate point the lever 268 engages a lever 271 pivoted at 272 upon one of the side members of the main frame 45. The other end of the lever engages a rod 273 slidably mounted in one of the hollow trunnions 53. The inner end of the rod engages the upper end of a lever 274 pivotally mounted on the portion 56 of the double-bail frame and connected to this portion by a spring 275. Attached to the other end of the lever is a strap 276 terminating in an eye which loosely surrounds a pin 277 projecting from the case of the level gyroscope.

In the operation of the instrument the target to which it is to be directed is first picked up by the trainer and pointer by slewing operations. To accomplish this the levers 9' and 29' are shifted from the positions shown in the drawing to their alternative positions in which the larger gears of the pairs 9 and 29 are in engagement with the pinions 20 and 31' respectively on shafts 11 and 31. At the same time the circuits of the motors 16 and 37 are broken at the switches 16' and 37' respectively.

There is thus established a direct drive from the trainer's hand wheels 3 through shaft 4, bevel gears 5, shaft 6, bevel gears 7, shaft 8, larger gear 9, pinion 20, shaft 11, bevel gears 12, shaft 13 and pinion 14 whereby the instrument may be rapidly trained until the image of the target produced by the reflecting prisms 137 and 141, the lenses 143, the pentaprism 144, the lens 145 and the lenses of the trainer's telescope 146 is brought into its field of view provided the pointer who is simultaneously operating the elements under his control has suitably adjusted the prism 137 as will now be described.

The pointer by manipulation of his hand wheels 23 will drive shaft 24, bevel gears 25, shaft 26, bevel gears 27, shaft 28, larger gear 29, pinion 31', shaft 31, bevel gears 32, shaft 33, gears 34 and 34' and the side 35' of the differential 35. Regarding the center 35'' of the differential as fixed since it is connected by shaft 80, bevel gears 79 and shaft 68 to the motor 69, the other side 35''' will be actuated to drive through gears 81, shaft 82, bevel gears 83, shaft 84, universal joint 86, shaft 87 and gears 89, the worm 90 to turn the gear sector 91 and the triple bail frame 109 to which it is connected. Through the pin 124 fitting within the recess in the end of the case of the angle gyroscope, the latter will be caused to follow the movement of the triple-bail frame within which it is mounted in accordance with the principles of gyroscopic action. Through the pin 124 the bail 123 will also be correspondingly turned and through link 126, arm 127 and shaft 128 turn the arm 130. Since the roller 131 at the end of this arm is held in contact with arm 132 by spring 134 the latter arm will also be turned, but only through one-half the angle through which the arm 130 is turned, since the latter is one-half the length of the arm 132. The movement imparted to arm 132 will through shaft 133, arm 135 and link 136 be transmitted to the reflecting prim 137 to turn it through one-half the angle of elevation of the target so that the image of the target is brought into the field of view of the pointer's telescope 150, this image being formed by the reflecting prisms 137 and 142, the lenses 147, the pentaprism 148, the lens 149 and the lenses of the telescope. It will be understood that the simultaneous operation of the instrument by the trainer will bring the image into the field of view of the pointer's telescope insofar as train is concerned.

As a result of the coacting slewing operations described above the lines of sight of the trainer's and pointer's telescopes will be directed at the desired target, after which the instrument will be put in condition for automatic operation, as will hereinafter be described, by manipulating the levers 9' and 29' to shift the gears 9 and 29 into the positions shown in the drawing and simultaneously establish the circuits of the motors 16 and 37 through the switches 16' and 37', respectively. The circuits of the motors are broken during the slewing operation to prevent them from having any effect upon the differentials 10 and 30 due to possible establishing of their control circuits through the contact devices associated with the angle gyroscope.

It will be understood that even during the preliminary setting of the instrument the level gyroscope 50 is in operation and, except for straying, maintains its plane of rotation fixed in space. Due, however, to the cross roll of the craft there will be relative movement between the gyroscope and the gimbal ring 52 about the trunnions 51. There will therefore be relative movement between the roller 99 and the contacts 101 to establish a circuit from the main 73 through one or the other of the conductors 103, according to the direction of the relative movement, and the corresponding field winding 104 of the motor 97 from which the circuit continues through armature 105 and conductor 77 to the other main 78. The energization of the motor will through shaft 96, worm 95 and gear sector 94 turn the main frame 45 and the gimbal ring 52 until the contacts 101 occupy their normal position with respect to the roller 99, that is, with the roller upon the insulation between the contacts. The elements thus constitute a follow-up system by which the main frame 45 by a series of steps as described above is maintained in a horizontal plane about its bearings 46 and 49.

The relative movement between the main frame 45 and the elements which move with the craft changes the relation between the ends of the arcuate portion 45' of the frame and the adjacent lower ends of the side arms 119. Due to the connection from the trunnions 108 at these ends of the main frame through the triple-bail frame 109, pin 124 and bail 123 to which the lower ends of the side arms 119 are connected, there is a readjustment of these parts whereby the side arms are turned about the inclined axis through the trunnions 118 and 121 to cause the circular plate 116 to be correspondingly turned. As this plate turns it also turns the arms 138 between which the prism 137 is mounted so as to turn the prism sufficiently to compensate for the effect of cross roll upon the images of the target in the fields of view of the trainer's and pointer's telescopes 146 and 150 respectively. In other words, the fields of view of these telescopes are stabilized against the effect of cross roll by compensating relative movement between the prism 137 and the remaining optical elements which partake of the cross roll of the craft.

As a result of roll of the craft there will be relative movement between the double-bail frame 54 and the gimbal ring 52 within which the level gyroscope is mounted. There will therefore be relative movement between the roller 71 and the contacts 72 to establish a circuit from the main 73 through one or the other of the conductors 74, according to the direction of the relative movement, and the corresponding field winding 75 of the motor 69 from which the circuit continues through armature 76 and conductor 77 to the other main 78. The energization of the motor 69 will through shaft 68, bevel gears 67, shaft 64, universal joint 63, shaft 62, gears 61, shaft 59, worm 58 and gear sector 57 turn the double-bail frame 54 until the roller 71 occupies its normal position upon the insulation between the contacts 72. The elements thus constitute a follow-up system by which the double bail frame 54 by a series of steps as described above is maintained in its normal relation to the level gyroscope 50.

The motor 69 through its shaft 68, bevel gears 79 and shaft 80 correspondingly drives the center 35" of the differential 35. Regarding the side 35' as fixed the second side 35'" will be turned and through the gears 81, shaft 82, bevel gears 83, shaft 84, universal joint 86, shaft 87, gears 89, worm 90 and gear sector 91 maintain the triple-ball frame 109 stabilized irrespective of the roll of the craft. The operation above described maintains the elements such as the triple-ball frame 109 and the ball 123 stabilized. Since the ball 123 controls the position of the prism 137 the latter will be maintained in a position to keep the target in the field of view of the telescopes irrespective of movement of the optical elements which move with the craft.

After the instrument has been directed at the target by the preliminary slewing operation, the estimated rate of change of bearing of the target in the plane of the line of sight and a horizontal line perpendicular to the line of sight is put into the instrument by the crank 164, the dial 166 showing when the desired value has been applied. The crank will be turned in one direction or the other according to the direction of the target with respect to the instrument. Through the bevel gears 168 and shaft 169, the carriage 171 will be displaced to a corresponding position and there will be a corresponding displacement of the rollers 184 on the rod 185. Assuming that the carriage is displaced downwardly from the position shown in Fig. 2, there will be a corresponding increase of the effective lever arm between the pivot 186 and the point at which the spring 177 applies its force to the rod 185 through the lever 174 and rollers 184. The increased force due to the increased lever arm will be transmitted through the strap 197, arms 198 and 199, rod 201, arm 202, shaft 203, arm 204 and wire 205 to the angle gyroscope 92 where it will overcome the opposing force exerted by the spring 207 to apply a torque to the gyroscope about the trunnion axis 108—108 to cause the gyroscope to precess about its trunnion axis 106—106 in the direction to follow the target.

Conversely if the carriage 171 be displaced upwardly from the position shown in Fig. 2 the effective lever arm of the rod 185 between the pivot 186 and the rollers 184 will be lessened so that the spring 207 associated with the angle gyroscope will overbalance the effect of the spring 177 applied through the strap 197 and the connected elements as previously described to cause a torque to be applied to the angle gyroscope about the trunnion axis 108—108 in the opposite direction to cause reverse precession about the trunnion axis 106—106.

In either case, as soon as the gyroscope precesses about its trunnion axis 106—106 the roller 152 carried by the gyroscope will be displaced from its normal position on the insulation between the contacts 154 carried by the gimbal ring 107 to establish a circuit from the main 73 through the roller and contact with which it is in engagement and the corresponding field winding 156 of the motor 16 from which the circuit will continue through the armature 157 of the motor, the switch 16' which is in a closed position and the conductor 77 to the other main 78.

The resultant energization of the motor 16 will through gears 15 turn the side 10'" of the differential 10 and regarding its other side 10' as fixed since it is connected to the trainer's hand wheels 3 which at this time are assumed to be fixed, the center 10" of the differential will be turned and through the shaft 11, bevel gears 12 and shaft 13, the pinion 14 will turn the base of the instrument within the rack 2 to cause the instrument to be automatically driven in accordance with the estimated movement of the target as put into the instrument by the crank 164.

In practice, however, the estimated rate of change of bearing of the target may differ from its true rate. Such difference will be manifest to the trainer by a departure of the target from the vertical cross wire of his telescope. Upon noticing such a deviation he will manipulate his hand wheels 3 to restore the target to the cross wire. This is accomplished through the shaft 4, bevel gears 5, shaft 6, bevel gears 7, shaft 8, gear 9, side 10' of the differential 10, center 10" of the differential (regarding the second side 10'" as fixed) shaft 11, bevel gears 12, shaft 13 and pinion 14 to produce a slight manual training of the instrument to correct for the deviation of the target. At the same time, the shaft 8 will through bevel gears 17 and shaft 18 drive the armature 189 of the generator 19, the field 190 of which is permanently energized from the mains 73 and 78 over conductors 191.

The current generated by the movement of the armature will energize the coil 187 with a polarity depending upon the direction of rotation of the armature of the generator which in turn depends upon the direction in which the trainer's hand wheels are turned to restore the target to the cross wire of his telescope. The energization of the coil 187 will result in a repulsion or attraction of the coil by the poles 192 and 196 of the permanently energized electro-magnet 193 so that there will be a corresponding displacement of the rod 185 to which the coil is attached. This will either increase or decrease the force applied to the angle gyroscope through the strap 197 and connected elements as previously described according to the direction of movement of the coil 187. There will, therefore be a corresponding change in the torque applied to the angle gyroscope to alter its rate of precession and this change will be accompanied by a corresponding change in the rate at which the instrument is automatically trained under the control of the angle gyroscope. In order that the changes in torque shall produce corresponding changes in the precession of the gyroscope the speed of its rotor should be maintained as nearly constant as possible.

In order, however, that the instrument may be maintained in corrected condition after the operations described above have been performed it is necessary to make a correctional adjustment by the crank 164 to slightly alter the position of the carriage 171 and therefore change the torque applied to the angle gyroscope to cause it to continue to precess at the correct rate to maintain the vertical cross wires of the trainer's and pointer's telescopes on the target.

Simultaneously with the automatic operation of the instrument in train there will be a similar operation in elevation. To produce this the crank 209 is adjusted in accordance with the estimated rate of change of elevation of the target, the value of this quantity being shown by the dial 211 geared to the crank. Through bevel gears 213 and shaft 214 carriage 216 will be displaced from its zero position in one direction or the other according to whether the elevation of the target is increasing or decreasing. As in the case of the training elements, displacement of the carriage downwardly from the position shown in Fig. 2 will increase the effective lever arm between pivot 227 and rollers 225 to cause a force to be applied through strap 236, arms 237 and 238, rod 240, lever 241, and wire 242 to the angle gyroscope 92 about the trunnion axis 106—106 to overbalance the force applied about this same axis by the spring 244 connected between the gyroscope and the gimbal ring 107. The torque thus applied to the gyroscope will cause it to precess about its trunnion axis 108—108 in the required direction to follow the target.

Also as in the case of the training elements, a displacement of the carriage 216 upwardly from the position shown in Fig. 2 will cause a decrease in the force applied to the angle gyroscope through the strap 236 and connected elements as described above so that the spring 244 will predominate in applying a torque to the gyroscope about the trunnion axis 106—106 to cause it to precess about the other trunnion axis 108—108 in the opposite direction.

In either case the precessional movement of the gyroscope will carry with it the gimbal ring 107 and there will be relative movement between the roller 160 carried thereby and the contacts 161 mounted on the surrounding triple-bail frame 109. A circuit will therefore be established from the main 73 through one or the other of the field windings 162 of the motor 37 according to the direction of precession of the gyroscope. The circuit will continue through the armature 163 of the motor, the now closed switch 37' and conductor 77 to the other main 78.

The energization of the motor 37 will through gears 36 drive the side 30''' of differential 30 and regarding its other side 30' as fixed since it is connected to the pointer's hand wheels 23, the center 30'' will be turned to drive the shaft 31 to which it is attached. The movement imparted to this shaft will be transmitted through bevel gears 32, shaft 33, gears 34, and 34' to the side 35' of the differential 35. Regarding its center 35'' as fixed since it is connected through shaft 80, bevel gears 79 and shaft 68 to the motor 69, the second side 35''' will be turned to drive through gears 81, shaft 82, bevel gears 83, shaft 84, universal joint 86, shaft 87, gears 89 and worm 90, the gear sector 91 and the triple-bail frame 109 to which it is connected. The elements above described thus constitute a follow-up system by which the frame will be automatically maintained in its normal relation to the angle gyroscope as the latter precesses.

The motion imparted to the triple-bail frame will be transmitted through pin 124 to the bail 123 and thence through the link 126, arms 127, 130, 132, 135 and link 136 to the prism 137 to alter its position in accordance with the changing elevation of the target to maintain the latter in the field of view of the trainer's and pointer's telescopes provided the instrument has been accurately adjusted.

In practice, however, a correction of the estimated rate of change of elevation of the target is usually required. This is made by the pointer who observing a deviation of the target from the horizontal cross wire of his telescope manipulates his hand wheels 23 to turn the side 30' of the differential 30 through shaft 24, bevel gears 25, shaft 26, bevel gears 27, shaft 28 and gear 29. Regarding the second side 30''' as fixed since it is connected to the motor 37, the center 30'' will be turned to drive the shaft 31, bevel gears 32, shaft 33, gears 34 and 34', sides 35' and 35''' of the differential 35, (regarding its center 35'' as fixed) gears 81, shaft 82, bevel gears 83, shaft 84, universal joint 86, shaft 87, gears 89, worm 90 and gear sector 91 to alter the position of the triple-bail frame 109 and therefore the bail 123 connected thereto by the pin 124. The correcting movement thus imparted to the bail 123 will be transmitted through the links and arms previously described to the prism 137 to change it sufficiently to restore the horizontal cross wires of the telescopes to the target.

While a correctional movement is being imparted to the prism the armature 230 of the generator 40, shown in Fig. 2, will be rotated from shaft 28 through bevel gears 38 and shaft 39. Since the field 231 of this generator is permanently energized from the mains 73 and 78 current will be supplied to the coil 228 attached to the end of rod 226 over conductors 229. This coil functions in the manner already described in connection with coil 187 and through strap 236 and the connected elements applies a correctional torque to the angle gyroscope to cause it to precess about its trunnion axis 108—108 as the triple-bail frame is manually moved by the pointer so that the gyroscope and frame maintain their normal relation to each other while the correctional adjustment is being made in the position of the prism 137. Any deviation between the gyroscope and the frame during this operation causes the motor 37 to be energized by the resulting relative movement between the roller 160 and contacts 161. The motor acting through the differential 30 superimposes upon the movement being imparted to shaft 31 and the triple-bail frame 109 by the pointer a correctional movement to cause the frame to follow the movement of the gyroscope.

As in the case of training corrections, it is necessary to alter the rate of change of elevation as originally set up in the instrument by suitable manipulation of the crank 209 in order that the target may be accurately followed by the instrument.

It will be understood that throughout the operation of the instrument the level gyroscope 50 is continually functioning in the manner already described to compensate for the effect upon the instrument of roll and cross roll of the craft while the angle gyroscope is controlling the instrument to automatically maintain the lines of sight of its telescopes upon the target in both train and elevation.

Reference has previously been made to the fact that the level gyroscope is subject to straying which is manifest by the departure of the bubble of the spirit level 246 from its normal position. Such straying may be about either of its trunnion axes alone or a combined movement about both of these axes. If the straying be about the trunnion axis 51—51 an operator manipulates the handle 247 which through rod 249, arm 250 and lever 251 swings the lever 255 to alter the position of the rod 257 to actuate the arm 258 and the arm 261 connected thereto by the shaft 259 until the eye at the end of strap 262 engages pin 263, the eye being normally out of engagement with the pin so as not to interfere with the slight relative movement between the gyroscope and its gimbal ring 52 which occurs as the gyroscope is performing its stabilizing function. By further movement of the handle 247 a torque may be applied to the gyroscope about its trunnion axis 53—53 of sufficient magnitude to cause the gyroscope to precess about its trunnion axis 51—51 until the bubble of the spirit level occupies its normal position, after which the elements of the precessing mechanism are restored to their normal positions by the centralizing spring 248 when the handle 247 is released.

When the level gyroscope strays about its trunnion axis 53—53 the handle 264 is manipulated to turn the rod 266, arm 267 and levers 268 and 271 to displace the rod 273 and the lever 274 until the eye at the upper end of the strap 276 engages the pin 277 projecting from the case of the gyroscope. By further movement of the handle 264 a torque may be applied about the trunnion axis 51—51 to cause precession about the trunnion axis 53—53 until the bubble of the spirit level occupies its normal position showing that compensation has been made for straying of the gyroscope. The centralizing spring 265 restores the handle to normal position after it has been suitably actuated to correct for the straying of the gyroscope.

It will be understood that in practice all of the automatic operations hereinbefore described in sequence occur simultaneously while the correcting operations are performed manually from time to time or continuously as required, so that the sighting elements of the instrument are maintained in a predetermined relation to a line to the target irrespective of roll and cross roll of the craft when the correct rates of change of bearing and change of elevation have been set up in the instrument, the operators being only required to make the necessary adjustments to correct for changes in the motion of the target.

While a preferred embodiment of the invention has been shown and described it will be understood that it may be embodied in other forms and that various changes in structural details may be made without departing from its principle as defined in the appended claims.

I claim:

1. In a fire control instrument, the combination of a gyroscope, means settable to be self-acting to apply torques about mutually perpendicular axes of said gyroscope to precess the same in train and elevation, directional mechanism, and independently operable connections between said gyroscope and mechanism controlled by the former to automatically direct said mechanism in train and elevation.

2. In a fire control instrument, the combination of a gyroscope, means settable to be self-acting to apply torques about mutually perpendicular axes of said gyroscope to precess the same in train and elevation, directional mechanism, means to direct said mechanism in train and elevation, and electric controls for said directing means governed by said gyroscope.

3. In a fire control instrument, the combination of a gyroscope, torque-applying means settable to be self-acting to precess said gyroscope in train and elevation, directional mechanism, means operable under the control of said gyroscope to direct said mechanism in train and elevation at a target, and auxiliary force-applying means operable to act on said torque-applying means as set to modify the torques applied thereby to said gyroscope in accordance with changes in the relative motion between the instrument and the target.

4. In a fire control instrument, the combination of a gyroscope, torque-applying means settable in accordance with estimated rates of movement of a target in train and elevation to precess said gyroscope in correspondence therewith, directional mechanism directed in train and elevation by said gyroscope, force-generating means operable proportionately to the differences in the estimated and true rates of movement of the target, and force-applying means responsive thereto to act on said torque-applying means as set.

5. In a fire control instrument, the combination of adjustable optical means provided with means to separately observe the relative angles between two relatively movable objects in train and elevation, a gyroscope, controlling means therefor settable in accordance with estimated rates to automatically precess said gyroscope in train and elevation, means responsive to said gyroscope to direct said observing means to follow the movements of one of said objects in train and elevation, and correcting means actuated in accordance with separate indications of said observing means and acting on said controlling means to modify the precessional action thereof in accordance with differences between the observed relative movements and the automatic movements.

6. In a fire control instrument, a gyroscope, torque-applying means settable to precess said gyroscope in train and elevation, an adjustably mounted device, and controlling means therefor electrically governed by said gyroscope to automatically maintain said device in predetermined relation to a line of sight between two relatively moving objects irrespective of their relative movements in train and elevation.

7. In a fire control instrument, the combination of a gyroscope, an adjustable optical device for viewing a movable object, separate mounting means for said gyroscope and said device mounting the latter independently of said gyroscope, means controlling said gyroscope to cause it to generate the angular relation between the device and the object, and operating means between said gyroscope and device controlled by said gyroscope to adjust said device and maintain the latter at the generated angular position.

8. In a fire control instrument, the combination of a sighting device, a gyroscope controlling said device, precessing means for said gyroscope adjustable to cause the latter to control said device to automatically direct the line of sight of the device upon a target, and stabilizing mechanism co-operative with said gyroscopic control to maintain the line of sight upon the target irrespective of angular movement of the craft on which the instrument is mounted.

9. In a fire control instrument, the combination of a sighting device, force-applying means subject to regulation in accordance with movements of a target, an intermediary control between said force-applying means and sighting device governed by the former and controlling the latter, and partially stabilized means operable in response to roll and cross roll of the craft on which the instrument is mounted and co-acting with said intermediary control to automatically maintain the line of sight of the device upon a target.

10. In a fire control instrument, the combination of a sighting device, force-applying means subject to regulation in accordance with movements of a target, an intermediary control between said force-applying means and sighting device governed by the former and controlling the latter, partially stabilized means operable in response to roll and cross roll of the craft on which the instrument is mounted and co-acting with said intermediary control to automatically maintain the line of sight of the device upon a target, and adjusting means operable to modify the force of said force-applying means to correct for changes in the relative motion between the craft and the target.

11. In a fire control instrument, the combination of displaceable means, a directing device therefor, a governing control for said device, a mounting for the device susceptible to displacement in accordance with the roll and cross roll of a craft upon which the instrument is mounted, a gyroscope, means controlled by relative movement of said mounting and gyroscope operable to act on said directing device to compensate for the effect thereon of such roll and cross roll, and means for correcting straying of the gyroscope.

12. In a fire control instrument, the combination of a sighting device movable in elevation and train, controlling means comprising stabilized elements, displaceable elements co-acting with the first named elements and movable relatively thereto in accordance with the roll and cross roll of the craft on which the instrument is mounted, and adjustable members controlled by said stabilized and displaceable elements to maintain a stable plane of reference from which the movements in elevation of the sighting device may be determined, and means including an azimuth reference point to serve as a datum from which the movements in train of the device may be determined.

13. In a fire control instrument, the combination of a directing device, adjustable precessing means, a gyroscope governed thereby to maintain the directing line of the device upon a target, and automatic means to compensate for the effect upon the directing device of motion of the craft upon which the instrument is mounted about mutually perpendicular horizontal axes, said compensating means including a stabilizing device and electrical controls governed by the stabilizing device and the motion of the craft.

14. In a fire control instrument, the combination of a support, an optical element movably mounted on the support for viewing a target, a frame pivotally mounted on the support about an axis substantially parallel to the horizontal component of the line of sight of the element, a gyroscope supported within the frame upon an axis parallel to the axis of the frame and upon an axis perpendicular to said axis that is parallel to the axis of the frame, a power driven follow-up mechanism for maintaining the frame in predetermined relation to the gyroscope with respect to the axis of the frame, a second power driven follow-up mechanism for maintaining the optical element in predetermined relation to the gyroscope with respect to the axis perpendicular to the axis of the frame, means rendered active by straying of the gyroscope to indicate such straying and means for compensating for such straying of the gyroscope about its axes.

15. In a fire control instrument adapted to be mounted on a rockable craft, the combination of a member mounted to be directed in train and elevation, a directing device therefor displaceable in train and elevation, operating means operable in accordance with rates of train and elevation controlling said device, a stabilizing gyroscope, a plurality of pivoted frames some of which universally support said gyroscope about mutually perpendicular axes, electrical contact devices having co-acting contacts respectively stabilized by said gyroscope and movable by said frames in response to roll and cross roll of the craft upon which the instrument is mounted, and adjusting means controlled by said contact devices to modify the operation of said directing device and directed member to compensate for the effect thereupon of the roll and cross roll of the craft.

16. In a fire control instrument, the combination of a support, a frame pivotally mounted upon said support for movement about an axis, stabilizing means governing said frame to stabilize the same about its said axis, a rigid angularly displaceable structure mounted on said support for movement about an inclined axis, an optical element pivotally mounted on said structure about an axis perpendicular to said inclined axis, a directing device universally mounted on said frame, connections between said directing device and angularly displaceable structure for turning the latter upon relative movement between said support and said frame, and connections between said directing device and said optical element for turning the latter about its axis in predetermined relation to the relative movement between said directing device and said frame.

17. In a fire control instrument, the combination of a support, a frame pivotally mounted upon said support for movement about an axis, stabilizing means governing said frame to stabilize the same about its said axis, a rigid angularly displaceable structure mounted on said support for movement about an inclined axis, an optical element pivotally mounted on said support about an axis perpendicular to said inclined axis, a directing device mounted on said frame for movement in elevation with respect to said frame, operating connections between said stabilizing means and said directing device, actuating means controlling said directing device to move the same in accordance with the movement in elevation of a target, connections between said directing device and said rigid angularly displaceable structure for turning the latter upon relative movement between said support and said frame, and connections between said directing device and said optical element for turning said element about its axis in predetermined relation to the relative movement between said directing device and said frame and/or the movement in elevation of the target.

18. In a fire control instrument, the combination of directional mechanism, a gyroscope, electrically controlled means governed by said gyroscope to operate said mechanism, and torque-applying means settable in accordance with the rate of change of position of a target in a given direction to be self-acting to precess said gyroscope whereby the latter actuates said electrically controlled means to direct said mechanism at the target.

19. In a fire control instrument, the combination of directional mechanism, a gyroscope controlling said mechanism, members relatively displaceable in accordance with the estimated rate of change of position of a target in a given direction, co-acting levers pivotally mounted on the respective members the pivot of each lever being fixedly located with respect to the member mounting the lever, force-applying means acting on one of said levers, torque-applying connections from the other lever to said gyroscope for precessing the same to direct said mechanism at the target, and adjusting means operable according to the true rate of change of position of the target to adjust the torque-applying means in accordance with differences between the estimated and true rates of change of position.

20. In a fire control instrument, the combination of a universally mounted gyroscope, torque-applying means settable in accordance with the estimated rates of change of bearing and elevation of a target to precess said gyroscope about mutually perpendicular axes, positioning means responsive to the precession of the gyroscope about said axes, a sighting device actuated by said positioning means to follow a target in train and elevation and being provided with observing portions respectively indicating in train and in elevation the following movement of the sighting device with respect to the true movement of the target, and adjusting means energizable to co-act with said torque-applying means to adjust the latter in accordance with differences between the estimated and true rates of change of bearing and elevation to cause the line of sight of said sighting device to accurately follow the target.

21. In a fire control instrument, the combination of a support subject to angular movements about mutually perpendicular axes, optical elements rigid with said support to partake of angular movements of the latter about said mutually perpendicular axes, an adjustable optical element mounted in co-operative relation to the first named optical elements for movement independently thereof about axes of train and elevation, a stabilizing device, operating connections between said device and said adjustable optical element controlled by the former to move the latter to compensate for relative movements between the stabilizing device and the support about the first named axes, and controlling mechanism operable to direct said adjustable optical element about axes of train and elevation independently of said other optical elements.

22. In a fire control instrument for use on a craft subject to oscillatory movement, the combination of a sighting device having optical elements partaking of the movement of the craft, a co-operating optical element mounted for movement about mutually perpendicular axes, a pivotally mounted gyroscope, connections automatically operable by said gyroscope to move said co-operating optical element about said axes to compensate for the effect upon said sighting device of the roll and cross roll of the craft, an indicator actuated by said gyroscope to indicate straying thereof, precessional means operable to act on said gyroscope to compensate for its straying, and actuating means for said co-operating optical element to move the latter about its said axes to follow a target in train and elevation.

23. In a fire control instrument subject to oscillatory movement, the combination of directional mechanism, stabilizing means partially controlling the same to compensate for the effect upon the mechanism of angular movement of the craft on which the instrument is mounted, and force-applying rate control mechanism settable in accordance with the rates of movement of a target moving both in train and elevation and operable independently of said stabilizing means for applying forces to said directional mechanism to continuously direct the same at the target.

24. In a fire control instrument subject to oscillatory movement, the combination of directional mechanism, stabilizing means partially controlling the same to compensate for the effect upon the mechanism of angular movement of the craft on which the instrument is mounted, rate control mechanism settable in accordance with the movement of a target both in train and elevation and operable independently of said stabilizing means to direct said directional mechanism at the target, and adjusting means co-acting with said rate control mechanism to modify the action thereof in accordance with changes in the relative motion between the instrument and the target.

25. In a fire control instrument, the combination of a support, a sighting device mounted on said support for movement in train therewith and for movement in elevation with respect to the support, means for imparting to the support a slewing movement in train, variable speed mechanism settable to be self-acting comprising force-applying means and actuating mechanism automatically responsive to force applied by said means to move said support and sighting device in train, adjusting means to set said force-applying means to cause said actuating mechanism to automatically move said support and sighting device in accordance with the rate of movement of the target in train, means for imparting to the sighting device a slewing movement in elevation, another variable speed mechanism settable to be self-acting comprising other force-applying means co-acting with said actuating mechanism, the latter being also automatically responsive to force applied by said second force-applying means to move said sighting device in elevation, and adjusting means to set the second named force-applying means to cause said actuating mechanism to automatically move said sighting device in accordance with the rate of movement of the target in elevation, both said variable speed mechanisms co-acting to maintain said sighting device upon the target.

26. In a fire control instrument, the combination of a directing device, an operating drive for imparting a slewing movement to said device, means for automatically directing said device at a target comprising adjustable torque-applying means comprising force-developing means and regulating mechanism therefor settable in accordance with the rate of movement of the target, a gyroscope responsive to said torque-applying means, the latter being self-acting upon the gyroscope when so set, and connections between said gyroscope and directing device capable of being interrupted, and control-determining mechanism selectively operable to interrupt or maintain said connections from said gyroscope to said directing device and to effect a slewing connection from said operating drive to said directing device when said connections from the gyroscope thereto are interrupted.

27. In a fire control instrument, the combination of a rotary support, a directing device movable therewith in train and independently thereof in elevation, torque-applying means settable to be self-acting in accordance with the rates of movement in train and elevation of a target having such movement, a gyroscope mounted for precession in train and elevation responsive to said torque-applying means, actuating connections controlled by said gyroscope and operatively connected to said rotary support and to said directing device, slewing mechanisms for slewing said device in train and elevation, and selective mechanisms operable to operatively combine said actuating connections from the gyroscope to said directing device to automatically and continuously direct said device upon the target, said selective mechanisms also being operable to interrupt said operative combination of said connections to said device and to combine said slewing mechanisms with said support and device for effecting the slewing of the latter in train and elevation.

28. In a fire control instrument, the combination of a constant speed gyroscope, torque-applying means acting on said gyroscope in accordance with the rate of change of position of a target to cause corresponding precession of said gyroscope, co-acting electrical contacts controlled by said gyroscope, operating mechanism including electrical power apparatus controlled by said co-acting contacts, and angularly displaceable directional mechanism controlled by said operating mechanism to be directed at the target.

29. In a fire control apparatus, the combination of a gyroscope, a displaceable member settable in accordance with the rate of change of a given factor, an extensible spring having an end portion secured to said member and a free end, a lever pivotally mounted on said member and connected to the free end of said spring, a second lever fixedly pivoted, the first named lever being displaceable by said member along said second lever to apply force to the latter, and connections from said second lever to said gyroscope to apply a torque thereto in accordance with said rate of change, said first named lever being shaped to produce compensating changes in its effective length for changes in the length of said spring.

30. In a fire control instrument, the combination of a universally mounted constant speed gyroscope, a plurality of force-developing mechanisms each adjustable to produce a force proportional to a rate of change in an angular relation between two objects, connections controlled by said mechanisms to apply the forces developed by the latter to said gyroscope to precess the same to generate the angular relation between the objects, and electrical mechanisms operable to generate electric current and including electro-magnetic force-applying means responsive to the generated current to modify the force produced by said first named mechanisms in accordance with variations in the said angular relation.

31. In a fire control instrument, the combination of directional mechanism, a universally mounted gyroscope, torque-applying mechanisms adjustable proportionally to rates of change in the angular relation between two objects and acting on said gyroscope to precess the same to generate the angular relation between the objects, power-actuated connections between said gyroscope and directional mechanism including electrical controls operated by said gyroscope, electric current generating means, electro-magnetic force-applying means responsive to said current generating means to modify the force applied by said torque mechanisms to said gyroscope, and manual operating means controlling said electric current generating means in accordance with variations in the said angular relation of the objects.

32. In a fire control instrument, the combination of directional mechanism, a gyroscope, power actuated means controlled by said gyroscope for directing the mechanism, a device including an adjustable spring operated part settable in accordance with the rate of change of position of a target, and means automatically operated by the device for applying a torque to the gyroscope to cause it to precess, whereby the directional mechanism will be maintained accurately directed at the target.

33. In a fire control instrument, the combination of a gyroscope, means including an adjustable spring operated part settable in accordance with the rate of change of position of a target in a plurality of planes, means under the control of said settable means for causing precession of the gyroscope in accordance with said rates, a sighting device, and power actuated means controlled by connections between the gyroscope and the device for moving the device in accordance with said rates.

34. In apparatus for determining the rate of change of position of a target, the combination of a gyroscope, power actuated directional mechanism controlled by the gyroscope, means for precessing the gyroscope in a plurality of planes to maintain the mechanism directed at the target, and means including an adjustable spring operated part associated with the precessing means for indicating the rate of change of position of the target.

35. In a fire control instrument, the combination of a gyroscope, means settable to be self-acting to apply torques about mutually perpendicular axes of said gyroscope to precess the same about said axes, directional mechanism, and independently operable connections between said gyroscope and mechanism controlled by the former to automatically direct said mechanism.

36. In a fire control instrument, the combination of a gyroscope, torque-applying means settable to be self-acting to precess said gyroscope about angularly related axes, directional mechanism adjustable about angularly related axes, means operable under the control of said gyroscope to direct said mechanism about its axes at a target, and auxiliary force-applying means operable to act on said torque-applying means as set to modify the torques applied thereby to said gyroscope.

37. In a fire control instrument, the combination of directional mechanism, a gyroscope, power actuated means controlled by said gyroscope and connected for directing the mechanism in train, a device including an adjustable spring operated part settable in accordance with the rate of change of position in train of a target, a second power actuated means controlled by said gyroscope and connected for directing the mechanism in elevation, a second device settable in accordance with the rate of change of position of the target in elevation, and means automatically operated by the devices for applying torques to the gyroscope to cause it to precess in train and elevation, whereby the directional mechanism will be maintained accurately directed at the target.

HANNIBAL C. FORD.

REFERENCES CITED

The following references are of record in the file of this patent:

UNITED STATES PATENTS

| Number | Name | Date |
|---|---|---|
| 728,990 | Schneider | May 26, 1903 |
| 1,031,769 | Barr et al. | July 9, 1912 |
| 1,032,022 | Von Petravic | July 9, 1912 |
| 1,390,471 | Sundhaussen | Sept. 13, 1921 |
| 1,553,077 | Henderson | Sept. 8, 1925 |
| 1,553,078 | Henderson | Sept. 8, 1925 |
| 1,687,551 | Ellis et al. | Oct. 16, 1928 |
| 1,688,559 | Sperry | Oct. 23, 1928 |
| 1,731,776 | Henry | Oct. 15, 1929 |
| 1,733,531 | Dugan | Oct. 29, 1929 |